United States Patent
Wang et al.

(10) Patent No.: US 10,514,718 B2
(45) Date of Patent: Dec. 24, 2019

(54) QUICK DISCONNECT SCREED BOX HANDLE

(71) Applicant: Graco Minnesota Inc., Minneapolis, MN (US)

(72) Inventors: Rehmer Wang, Jiangsu (CN); Steven Shao, Jiangsu (CN)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/301,801

(22) PCT Filed: Mar. 30, 2015

(86) PCT No.: PCT/US2015/023297
§ 371 (c)(1),
(2) Date: Oct. 4, 2016

(87) PCT Pub. No.: WO2015/153433
PCT Pub. Date: Oct. 8, 2015

(65) Prior Publication Data
US 2017/0185098 A1    Jun. 29, 2017

Related U.S. Application Data

(60) Provisional application No. 61/975,257, filed on Apr. 4, 2014.

(51) Int. Cl.
*G05G 1/04* (2006.01)
*E01C 23/20* (2006.01)
(Continued)

(52) U.S. Cl.
CPC ............. *G05G 1/04* (2013.01); *E01C 23/206* (2013.01); *E01C 23/24* (2013.01); *F16B 7/20* (2013.01); *G05G 1/12* (2013.01)

(58) Field of Classification Search
CPC ................ G05G 1/04; G05G 1/00; F16B 7/20
See application file for complete search history.

(56) References Cited

U.S. PATENT DOCUMENTS 402,132 A * 4/1889 Berry ..................... F16B 7/20
                                                     279/90
1,294,304 A   2/1919 Pittman
(Continued)

FOREIGN PATENT DOCUMENTS

KR         0140718 Y1     4/1999
KR       100700037 B1     3/2007

OTHER PUBLICATIONS

International Search Report and Written Opinion from PCT Application Serial No. PCT/US2015/023297, dated Jun. 25, 2015, 10 pages.

*Primary Examiner* — Vicky A Johnson
(74) *Attorney, Agent, or Firm* — Kinney & Lange, P.A.

(57) ABSTRACT

A quick disconnect handle assembly includes a handle and a handle mount. The handle includes a shaft, a spring, and a pin at or near an end of the shaft and configured to restrain movement of the spring in a first direction. The handle mount includes a body having a first end and second end opposite the first end, a passageway through the body, and a first recess configured to receive the pin and lock the handle in the handle mount. The passageway has an inlet at the first end and an outlet at the second end and has a cross-sectional shape substantially the same as a cross-sectional shape of the shaft at the location of the pin, such that the shaft including the pin can be received in the passageway. The first recess opens at the outlet and extends longitudinally toward the inlet of the handle mount body.

18 Claims, 4 Drawing Sheets

(51) Int. Cl.
    *E01C 23/24*    (2006.01)
    *F16B 7/20*     (2006.01)
    *G05G 1/12*     (2006.01)

(56) References Cited

U.S. PATENT DOCUMENTS

| | | | |
|---|---|---|---|
| 2,527,256 A | | 10/1950 | Jackson |
| 3,345,711 A | | 10/1967 | McCarthy |
| 3,423,781 A | * | 1/1969 | Henson .................. A47L 13/24 |
| | | | 15/145 |
| 3,963,361 A | | 6/1976 | Schenk |
| 4,284,013 A | | 8/1981 | Davidson |
| 4,459,785 A | | 7/1984 | Zimmer |
| 4,711,596 A | | 12/1987 | Bruderer |
| 4,943,182 A | * | 7/1990 | Hoblingre ................. F16B 7/20 |
| | | | 403/325 |
| 5,513,622 A | * | 5/1996 | Musacchia, Sr. ......... F16B 7/20 |
| | | | 124/86 |
| 6,029,535 A | * | 2/2000 | Kenny ................ F16H 59/0278 |
| | | | 403/349 |
| 7,293,938 B1 | * | 11/2007 | Suckow ................ E01C 19/402 |
| | | | 404/114 |
| 8,672,380 B2 | | 3/2014 | Carter et al. |
| 2008/0177265 A1 | | 7/2008 | Lechot |
| 2009/0208282 A1 | | 8/2009 | Hale |
| 2013/0205675 A1 | | 8/2013 | Twell |
| 2013/0302090 A1 | | 11/2013 | Fredrickson et al. |

\* cited by examiner

QUICK DISCONNECT SCREED BOX HANDLE

BACKGROUND

The present invention relates generally to pavement marking, and more particularly to a handle/actuator assembly for a thermoplastic die box.

Alkyd and hydrocarbon thermoplastics are commonly used to mark pavement surfaces with visible lines and symbols such as lane dividers and guide lines. In particular, thermoplastics provide a durable alternative to pavement painting, and are commonly used to mark street intersections, parking lots, and other high-traffic pavement surfaces from which paint would quickly wear away.

Thermoplastics are conventionally applied to pavement surfaces using a mobile applicator comprising a heated reservoir or kettle, and an application screed die. Melted thermoplastic is dispensed from the kettle at a controlled rate and applied in a thin layer atop pavement surfaces with the screed die. Some applicators further comprise secondary burners, which heat secondary reservoirs or the screed die.

In general, governmental regulations determine width or pattern of lines and marks on street intersections and parking lots. In order to achieve lines or patterns of varying widths, the appropriately sized screed die box must be used with a gate valve set to the appropriate height from the surface. Generally, screed die boxes are available in sizes ranging from 4-12 inches in width. A gate valve height can be preset such that a handle or lever is used only to open and close the screed die box during operation. Screed die boxes are regularly interchanged at the application site, where a user is limited by time constraints and the absence of mechanical facilities for storage and disassembly/reassembly. Handles welded or securely bolted to the screed die box are designed to control the gate valve and to support the heavy screed die box when used to lift the screed die box off of the mobile applicator and move the screed die box off-site. Handles of unitary construction with the screed die box require significant storage space; whereas handles bolted to the screed die box require tools for disassembly/reassembly that must be stored and transported to job sites.

A need exists for a quick disconnect handle assembly capable of supporting the weight of a full screed die box when lifted, withstanding the force applied at the connection point of the handle and screed die box in opening and closing the gate valve, and remaining securely fastened without risk of accidental disconnection from the screed die box during operation.

SUMMARY

In one aspect, a quick disconnect handle assembly includes a handle and a handle mount. The handle includes a shaft, a spring, and a pin at or near an end of the shaft and configured to restrain movement of the spring in a first direction. The handle mount includes a body having a first end and second end opposite the first end, a passageway through the body, and a first recess configured to receive the pin and lock the handle in the handle mount. The passageway has an inlet at the first end and an outlet at the second end and has a cross-sectional shape substantially the same as a cross-sectional shape of the shaft at the location of the pin, such that the shaft including the pin can be received in the passageway. The first recess opens at the outlet and extends longitudinally toward the inlet of the handle mount body.

In another aspect, a screed die box handle assembly including a screed die box, a handle, a mounting bracket configured to hold the screed die box, and a handle mount connected to the mounting bracket. The handle includes a shaft, a pin at or near an end of the shaft, and a spring. The pin is configured to restrain movement of the spring in a first direction. The handle mount includes a body having a first end and a second end opposite the first end, a passageway through the body, and a first recess configured to receive the pin and lock the handle in the handle mount. The passageway has an inlet at the first end and an outlet at the second end and has a cross-sectional shape substantially the same as a cross-sectional shape of the shaft at the location of the pin, such that the shaft including the pin can be received in the passageway. The first recess opens at the outlet and extends longitudinally toward the inlet of the handle mount body.

In yet another aspect, a method for changing a handle on a screed die box includes the steps of: inserting a handle through a passageway of a mounting body on a screed die box holder; applying force to the handle such that a portion of the handle having a cross pin extends beyond an exit of the passageway; rotating the handle to align the cross pin with at least a first or second recess opening to an outlet of the passageway on the mounting body; and removing force applied to the handle to allow a tensioned spring to move the cross pin into at least one of the first or second recess on the holder and lock the position of the handle.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
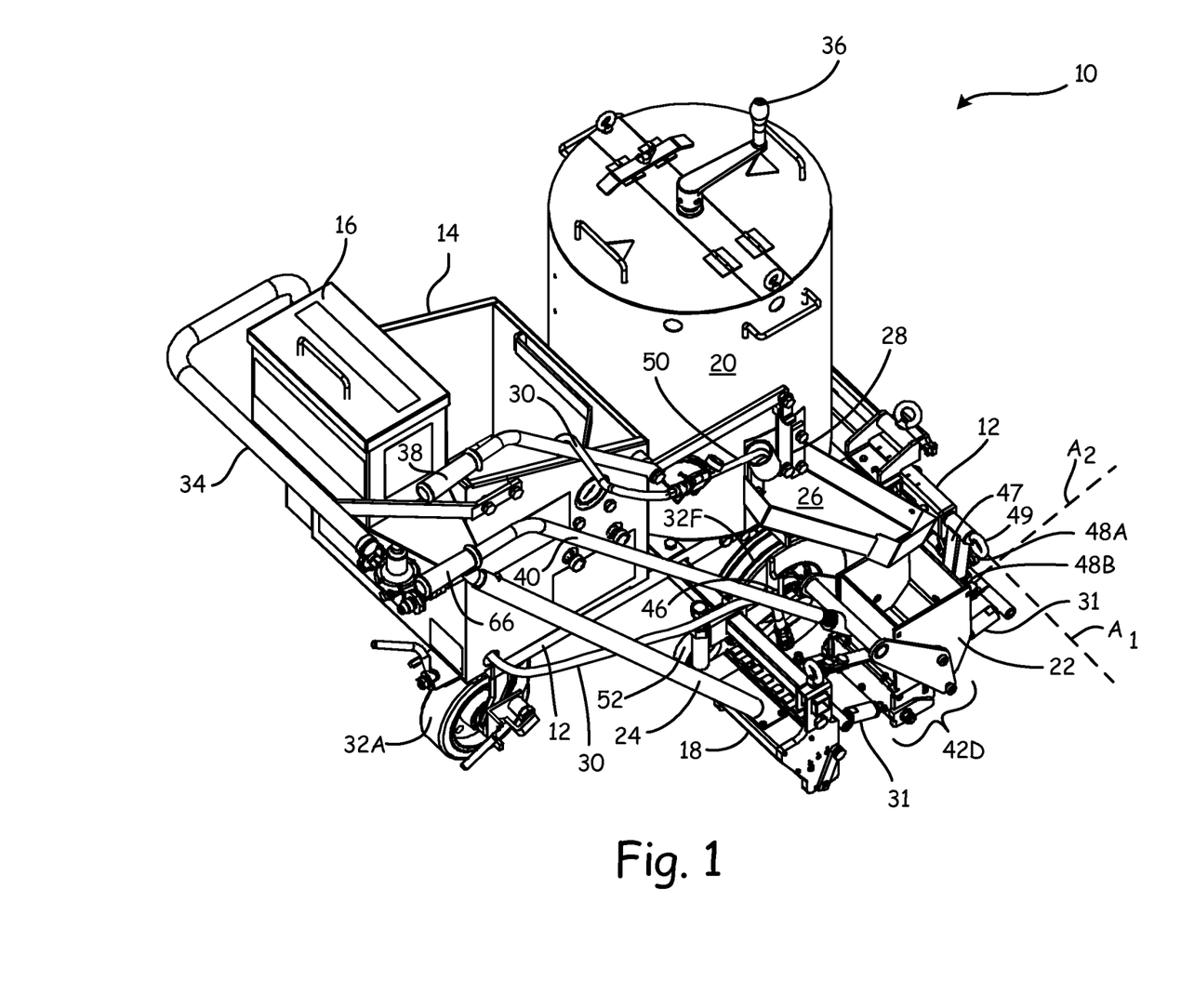
FIG. 1 is a perspective view of one embodiment of a thermoplastic mobile applicator.

FIG. 1 shows a perspective view of one embodiment of a thermoplastic mobile applicator 10. The mobile applicator 10 includes a frame 12, which holds a gas tank enclosure 14, gas tank (not shown), bead reservoir 16, bead dispenser 18, kettle 20, and screed die box 22. A bead tube 24 connects the bead reservoir 16 to the bead dispenser 18, and a chute 26 connects the kettle 20 with a gate valve 28 to the screed die box 22. A plurality of gas lines 30 (not all shown) connect a plurality of gas burners (not all shown), including screed die box burners 31, to the gas tank. The plurality of gas burners are used for heating thermoplastic at various locations. At least a single burner (not shown) is used to heat the kettle 20. The frame 12 further includes a plurality of driving wheels 32 and a push bar 34 for moving the mobile applicator 10 across a surface.

The mobile applicator 10 is a tool capable of marking lines by melting and then applying thermoplastic to a surface, generally including, but not limited to, pavement. The frame 12 provides support for other components of the mobile applicator 10. The frame 12 can, for instance, include a framework of aluminum and/or steel beams, tubes, and struts. The gas tank enclosure 14 can be attached to a rear section of the frame 12. The gas tank enclosure 14 is sized to hold the gas tank, which can contain propane, butane, or other suitable combustible fuel capable of heating the kettle 20 to a temperature necessary to melt thermoplastic. The driving wheels 32 are rotatably attached to a bottom of the frame 12 and allow the mobile applicator 10 to move along the pavement or surface. In the illustrated embodiment, the mobile applicator 10 includes three driving wheels (collectively referred to by reference character 32): a single rear wheel 32A, which swivels and provides directional control, and two front driving wheels 32F, located at a forward end of the frame 12. The push bar 34 can be attached at a rearward end of the frame 12 and allows a user to manually propel the mobile applicator 10 forward by pushing the push bar 34, such that the user can direct where surface markings are made. In alternate embodiments, a motor or other on-board power source (not shown) can optionally be used to help propel the mobile applicator 10.

The kettle 20 can be mounted to a top surface of the frame 12. The kettle 20 is a receptacle that is heated to melt thermoplastic and/or help prevent melted thermoplastic from re-solidifying. In the illustrated embodiment, the kettle 20 is a cylindrical receptacle heated by a gas burner positioned below the kettle 20. The kettle 20 can be made of a heat-resistant material including, but not limited to, steel or aluminum. Thermoplastic can be added to the kettle 20 in the form of a granular powder or in a pre-melted state. Molten or pre-melted thermoplastic is regularly stored in a larger heated receptacle on-site to reduce the time to application. Up to one hour may be required to melt granular thermoplastic in the kettle of the illustrated embodiment. The kettle 20 can include an agitator 36, which can be used to mix the thermoplastic as necessary.

The kettle gate valve 28 can be positioned between the interior of the kettle 20 and the chute 26, and is configured to allow molten thermoplastic to flow from the kettle 20 into the chute 26. The kettle gate valve 28 is opened and closed by a handle lever 38 extending from the kettle gate valve 28 to the reward end of the mobile applicator 10 for user operation. The chute 26 is a rigid, heat-resistant structure, which guides the molten thermoplastic from the kettle 20 to the screed die box 22. The chute 26 can include an opening positioned above and spaced from the screed die box 22, which allows the molten thermoplastic to fall into the screed die box 22 by way of gravity. The chute 26 can be made of a heat-resistant material including, but not limited to, aluminum or steel.

The screed die box 22 includes a handle 40, which extends from the screed die box 22 to the reward end of the mobile applicator 10 for user operation, and a gate valve assembly 42 configured to open a lower reward end of the screed die box 22. The handle 40 is connected to the gate valve 42 and configured to open the gate valve 42 when the handle 40 is lowered and close the gate valve 42 when the handle 40 is raised. When open, the gate valve 42 allows molten thermoplastic to flow from the screed die box 22 to the surface to be marked. A height to which the gate valve 42 opens can be adjusted to control the thickness of the thermoplastic as applied to the surface. Between applications, the handle 40 is raised and used to lift the screed die box 22 off of the surface to be marked and into a stowing cradle 46, which is located on the bead dispenser 18. Placing the screed die box 22 in the cradle 46 effectively closes the gate valve 42 and contains the thermoplastic in the screed die box 22. The screed die box 22 can be moveably connected to the frame 12 at the forward end of the mobile applicator 10 by a first linkage arm 47 configured to allow the screed die box 22 to swing back-and-forth about a pivot axis $A_1$ between a position at or near the surface to be marked and the cradle 46 above the surface to be marked while maintaining connection to the frame 12. A second linkage arm (not shown) can connect the screed die box 22 to the first linkage arm 47 using fastening members 48A and 48B. Fastening members 48A and 48B can include, but are not limited to, a bolt, nut, screw, or rivet. The second linkage arm can be configured to allow the screed die box to tilt side-to-side about a pivot axis $A_2$, wherein $A_1$ and $A_2$ are non-parallel pivot axes. A fastening member 49 can be used to attach the first linkage arm 47 to the frame 12. Generally, the fastening member 49 can be a bolt, nut, screw, or other suitable fastener configured to allow an operator to remove the screed die box 22 from the frame 12 and replace it with another screed die box 22 at the job site using limited tools or no tools. The screed die box 22, gate valve 42, and handle 40 can be made of a heat-resistant material including, but not limited to, aluminum or steel.

The gas tank can supply combustible gas to a kettle burner (not shown), a hand torch 50, and screed die box burners 31, used to prevent the molten thermoplastic from solidifying. The screed die box burners 31 and the hand torch 50 can be optional and may not be included in other embodiments. Screed die box burners 31 can be positioned to direct heat at both a front and rear surface of the screed die box 22 or at only one surface in alternate embodiments. A hand torch 50, which can be stowed in a receptacle on the kettle 20 or frame 12, can be used to direct heat where needed to melt the thermoplastic.

Light reflective beads can be used to provide increased visibility to thermoplastic markings. Light reflective beads, which are generally formed of glass, are deposited on freshly applied molten thermoplastic. In the illustrated embodiment, the bead reservoir 16, configured to store glass beads, can be positioned at the reward end of the mobile applicator 10. The bead tube 24 is configured to carry the beads from the bead reservoir 16 to the bead dispenser 18 by way of gravity. The bead tube 24 can be made of a flexible material to accommodate the pivoting motion of the bead dispenser 18. An actuator wheel 52 on the bead dispenser 18 rotates a dispensing shaft (not shown), positioned along an opening of the bead dispenser 18. The dispensing shaft rotates to drag the light reflective beads from the open dispenser 18 onto an applied layer of thermoplastic.

The actuator wheel 52 is driven by one of the plurality of driving wheels 32 on the frame 12 of the mobile applicator 10. The actuator wheel 52 can be positioned in contact with the driving wheel 32F by default such that the actuator wheel 52 rotates when the driving wheel 32F rotates. Therefore, when the mobile applicator 10 is in a stopped position, the actuator wheel 52 ceases to rotate, effectively stopping the dispensing of light reflective beads. When the screed die box 22 is positioned in the cradle 46, the weight of the screed die box 22 causes the bead dispenser 18 to pivot, forcing the actuator wheel 52 off of the driving wheel 32F. The single handle 40 used to position the screed die box 22 in the cradle 46 thereby both closes the screed die box gate valve 42 and stops operation of the bead dispenser 18. Removing the actuator wheel 52 from the driving wheel 32F allows the user to move the mobile applicator 10 without actuating the bead dispenser 18. The actuator wheel 52 and dispensing shaft can be made of a heat-resistant material including, but not limited to steel or aluminum and can be a knurled wheel and knurled shaft construction.

In order to operate the mobile applicator 10, a user ignites a pilot burner 51 and the kettle burner (not shown). Granular thermoplastic and/or molten thermoplastic is added to the kettle 20. The thermoplastic is melted by the kettle burner. The agitator 36 can be used to mix the thermoplastic as the thermoplastic melts. Once the thermoplastic is uniformly melted, the user can pull the handle lever 38 of the kettle gate valve 28 into an open position. Opening kettle gate valve 28 allows thermoplastic from kettle 20 to flow into the chute 26 and into the screed die box 22. Screed die box burners 31 heat the screed die box 22, allowing the thermoplastic to remain molten as the thermoplastic is dispensed.

The handle 40 of the screed die box 22 is raised to remove the screed die box 22 from the cradle 46 and lowered to position the screed die box 22 on the surface to be marked with the gate valve 42 open. With the screed die box gate valve 42 in an open position, the mobile applicator 10 is pushed forward, applying a layer of thermoplastic to the surface. The bead dispenser 18, which is driven by the forward motion of the driving wheel 32F, deposits light reflective beads atop the applied thermoplastic layer. The handle lever 38 of the kettle gate valve 28 can be positioned to open and close the kettle gate valve 28 to control the amount of thermoplastic in the screed die box 22. Upon completion, forward movement of the mobile applicator 10 is stopped, the kettle gate valve 28 is fully closed, and the screed die box 22 is lifted away from the surface to be marked using the handle 40, and positioned in the cradle 46 where it is stowed in a closed position.

Figure 2:
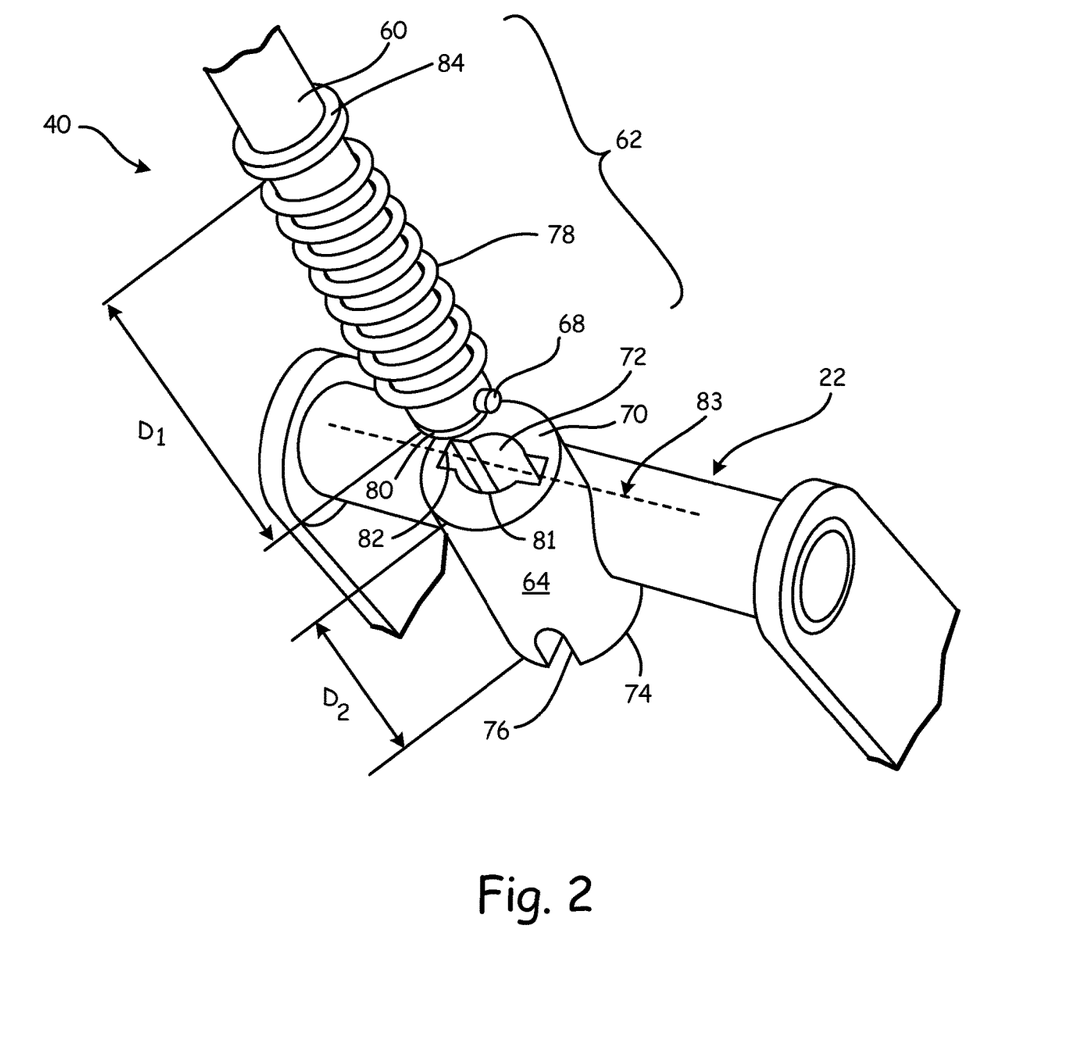
FIG. 2 is a top perspective view of a quick disconnect handle assembly for the thermoplastic screed die box in which the handle has been disconnected from the screed die box.
Figure 3:
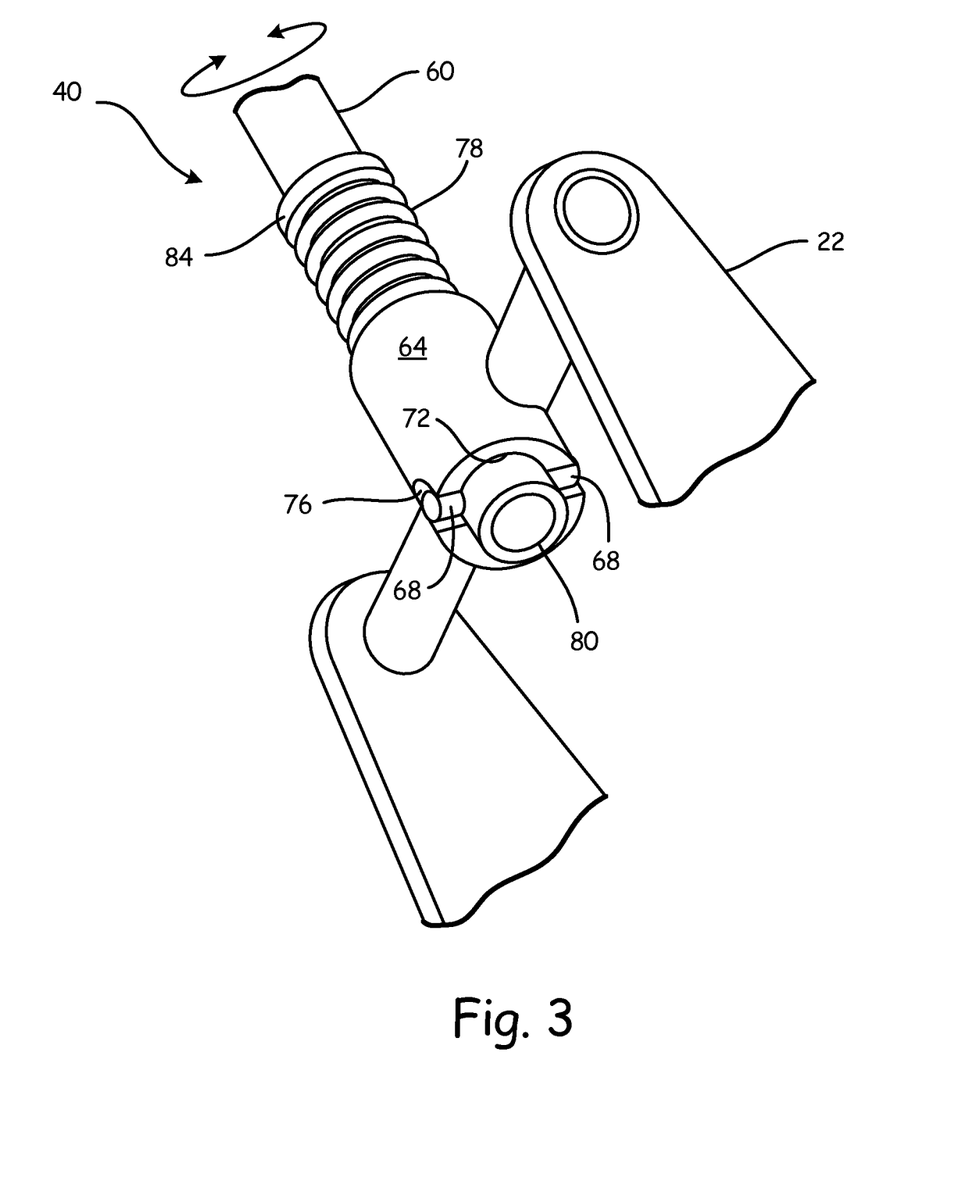
FIG. 3 is bottom perspective view of the quick disconnect handle assembly for the thermoplastic screed die box in which the handle has been connected to the screed die box.

FIGS. 2 and 3 show a top and bottom perspective view of the quick disconnect handle assembly 58. FIG. 2 shows the handle 40 disconnected from the screed die box 22, whereas FIG. 3 shows the handle 40 connected to the screed die box 22. The handle 40 includes a shaft 60 with a lower end having a fastening element 62 for connecting the handle 40 to screed die box 22 through a handle mount body 64 on the screed die box 22, and an upper end with a grip 66 (FIG. 1) configured for user operation. The upper end of the handle 40 is bent in relation to the remainder of the handle 40, placing the grip 66 in a position suitable for operation. The handle 40 can be hollow but of rigid construction to permit lifting and moving the screed die box 22. The screed die box 22, depending on size, can have a weight ranging from 20 to 50 pounds when empty and greater weight when filled with molten thermoplastic. The fastening element 62 of the handle 40 and the handle mount body 64 on the screed die box 22 can be of universal design such that a single handle 40 can be used with varying sizes of screed die boxes 22.

The handle 40 can be removably connected to the screed die box 22 by inserting a portion of the lower end of the handle 40 including a pin 68 into an upper open end 70 of the handle mount body 64 through a passageway 72 and out through a lower open end 74 of a handle mount body 64, turning the handle 40 to align the pin 68 with a recess 76 on the lower open end 74 of the handle mount body 64, and releasing the handle 40 to allow a spring 78 on the handle 40 to force the pin 68 into the recess 76 thereby locking the handle 40 in place. The grip 66 of the handle 40 can be aligned with the pin 68 such that the grip 66 and the pin 68 are oriented in a common plane.

Figure 4:
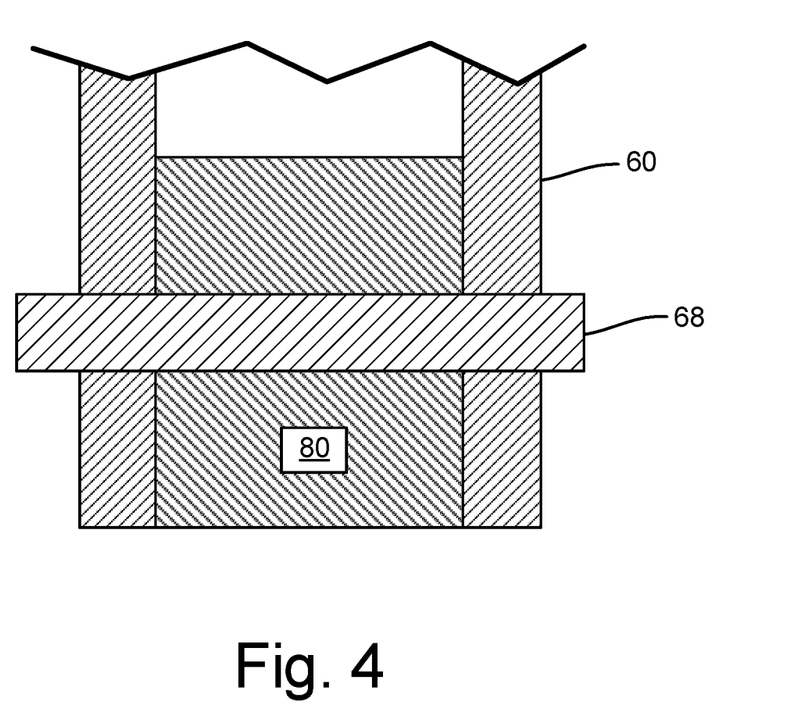
FIG. 4 is cross-sectional view of and end of the quick disconnect handle of FIG. 2.

The pin 68 can extend through the shaft 60 of the handle 40 such that a portion of the pin 68 protrudes from a first and second side of the shaft 60. Alternatively, the pin 68 can protrude from a first side only. The pin 68 can be positioned at or near the end of the shaft 60. As shown in FIG. 4, a shaft 60 of hollow construction can further include a solid plug 80 positioned inside the shaft 60 at the end to hold the pin 68 in place and add strength and rigidity to the pin 68 and shaft 60. The plug 80 can be welded to the shaft 60 or otherwise attached to prevent disassembly. The plug 80 can have a hole into which the pin 68 is pressure fit. The hole of the plug 80 can be aligned with a matching hole in the shaft 60, such that the pin 68 can be inserted through the side of the shaft 60 into the plug 80. FIG. 2 shows a single pin 68 extending fully through the shaft 60 and plug 80, such that two ends of the pin 68 extend from the sides of the shaft 60 at 180 degrees from each other. Although the embodiment shown includes only a single cross pin 68, it will be understood by one skilled in the art that multiple pins 68 can be used in alternate embodiments. Additionally, it will be understood that although the embodiment shown includes a pin 68 that extends through the shaft 60, a pin 68 can include any protrusion from the shaft 60 capable of being received in the recess 76 of the handle mount body 64 and can include protrusions welded to or otherwise attached to the shaft 60 or a shaft 60 and pin 68 of unitary construction.

A shape of a cross section of the shaft 60 at a location of the pin 68 can match a cross-sectional shape of the passageway 72 in the handle mount body 64, such that a length of the shaft 60 including the pin 68 can be received in the handle mount body 64. The passageway 72 can extend through the handle mount body 64 such that the handle mount body 64 is open at an upper and lower end 70, 74 of the handle mount body 64 and can allow the pin 68 and portion of the shaft 60 to fully exit the lower open end 74. In one embodiment, the cross-sectional shape of the passageway 72 includes a central circle 81 with a first and second rectangular tabs 82 extending outward from the circle 81 at a half line 83. It will be understood by one skilled in the art that the cross-sectional shape of the passageway 72 is not limited to the cross-sectional shape of the shaft 60 at the location of the pin 68, but can be any shape that allows passage of the pin 68 through the passageway 72.

One or more recesses 76 open to the lower open end 74 of the handle mount body 64, and extending outward from the passageway 72, can be configured to receive and retain the pin 68 when the handle 40 is turned. The embodiment shown in FIGS. 2 and 3 includes two recesses 76 positioned 180 degrees from each other to match the positioning of the pin 68 in the handle 40 and approximately 90 degrees from the rectangular tab 82 of the passageway 72. The recesses 76 can be shaped to match a cross-sectional shape of the pin 68, e.g., rounded to match a cylindrical pin. The recesses 76 can be open to a side of the handle mount body 64 or can be positioned within an interior of the handle mount body 64, as is the passageway 72. The recesses 76 extend longitudinally toward the upper open end 70 of the handle mount body 64, providing sufficient space for securing the pin 68. In general, the recesses 76 extend a longitudinal depth substantially equal to a cross-sectional width of the pin 68. Extending the recesses 76 greater than a cross-sectional width of the pin 68 can increase the strength of the locking mechanism, whereas reducing the depth of the recess 76 can increase the ease with which the handle 40 can be removed from the handle mount body 64. It will be understood by one skilled in the art that the positioning, length, and shape of the recesses 76 can be varied based on the positioning and shape of the pin 68 and the desired strength of the locking mechanism.

A spring 78 can be used to retain the pin 68 in the recesses 76. A spring 78 can be positioned adjacent the pin 68 on the exterior of the handle shaft 60 such that the pin 68 restrains movement of the spring 78 in first longitudinal direction and prevents the spring 78 from sliding off the end of the shaft 60. A shoulder 84 or circumferential ledge can be positioned on an external surface of the shaft 60 adjacent the spring 78 at an end of the spring 78 opposite the pin 68. The shoulder 84 can restrain movement in a second longitudinal direction opposite the first longitudinal direction. The passageway 72 can be sized such that the passageway 72 does not allow passage of the spring 78 into the handle mount body 64. Therefore, when the lower end of the handle 40 including the pin 68 is received in the handle mount body 64, the spring 78 is compressed between an upper end of the handle mount body 64 and the shoulder 84 of the handle 40. A distance $D_1$ between the shoulder 84 and the pin 68 is great enough to allow the pin 68 to pass through the lower open end 74 of the handle mount body 64, that is, greater than a distance $D_2$ between the upper open end 70 and lower open end 74, but small enough to ensure that the spring 78 is tensioned to provide suitable resistance against the handle mount body 64 when the handle 40 is in a locked position. After the pin 68 has passed through the lower open end 74 of the handle mount body and the handle 40 has been rotated to align the pin 68 with the recesses 76, the handle 40 is released, allowing the spring 78 to expand thereby pulling the pin 68 into recesses 76. Because the spring 78 remains partially compressed, the spring 78 provides sufficient tension to hold the pin 68 and, thereby handle 40, in place. The spring 78 can be a helical spring 78 or suitable alternative capable of providing sufficient resistance when the pin 68 is received in the recesses 76. The spring can be made of a heat-resistant material, including but not limited to, steel or aluminum.

The handle 40 can be disconnected from the screed die box 22 by applying a downward force on the shaft 60 to remove the pin 68 from the recesses 76, turning the handle 40 to align the pin 68 with the passageway 72, and releasing the handle 40 to allow the spring 78 to expand and pull the shaft 60 toward the upper open end 70 of the handle mount body 64. Once the handle 40 has been removed from the screed die box 22, the screed die box 22 can be more easily stored. The handle 40 can also be stored or connected to another screed die box 22 for continued use. The uniform construction of the handle 40 and handle mount body 64 on screed die boxes 22 of varying sizes makes it possible to use a single handle 40 for multiple screed die boxes 22 in a given application. The quick disconnect assembly requires no tools and therefore, significantly reduces the amount of time needed for assembly/disassembly. Additionally, the amount of space required for storage the screed die box 22 is substantially reduced when the handle 40 is removed.

DISCUSSION OF POSSIBLE EMBODIMENTS

The following are non-exclusive descriptions of possible embodiments of the present invention.

A quick disconnect handle assembly includes a handle and a handle mount. The handle includes a shaft, a spring, and a pin at or near an end of the shaft and configured to restrain movement of the spring in a first direction. The handle mount includes a body having a first end and second end opposite the first end, a passageway through the body, and a first recess configured to receive the pin and lock the handle in the handle mount. The passageway has an inlet at the first end and an outlet at the second end and has a cross-sectional shape substantially the same as a cross-sectional shape of the shaft at the location of the pin, such that the shaft including the pin can be received in the passageway. The first recess opens at the outlet and extends longitudinally toward the inlet of the handle mount body.

The quick disconnect handle assembly of the preceding paragraph can optionally include, additionally and/or alternatively, any one or more of the following features, configurations and/or additional components:

A further embodiment of the foregoing quick disconnect handle assembly, wherein the spring is on an external surface of the shaft.

A further embodiment of the foregoing quick disconnect handle assembly, wherein the shaft of the handle further includes a shoulder positioned on an external surface of the shaft and configured to restrain movement of the spring in a second longitudinal direction opposite the first direction and wherein, a length extending from the shoulder to the end of the shaft is greater than a length of the passageway of the handle mount body.

A further embodiment of the foregoing quick disconnect handle assembly, wherein the spring is a helical spring.

A further embodiment of the foregoing quick disconnect handle assembly, wherein the spring is compressed against the first end of the handle mound body when the handle is locked in the handle mount.

A further embodiment of the foregoing quick disconnect handle assembly, wherein the pin extends through a cross-section of the shaft of the handle and wherein the pin has length that is greater than a width of the shaft and wherein the pin extends beyond the shaft on both a first and a second side of the shaft.

A further embodiment of the foregoing quick disconnect handle assembly, wherein the first recess opens to the first side of the handle mount body.

A further embodiment of the foregoing quick disconnect handle assembly, wherein the handle mount further includes a second recess configured to receive the pin, wherein the second recess is positioned opposite the first recess on the shaft.

A further embodiment of the foregoing quick disconnect handle assembly, wherein the shaft of the handle further includes a hollow tube; at least one of a first or second hole for holding the pin; and a plug seated in the end of the shaft and fixedly attached to the shaft. The plug has a third hole for holding the pin, which is aligned with at least one of the first or second hole.

A screed die box handle assembly including a screed die box, a handle, a mounting bracket configured to hold the screed die box, and a handle mount connected to the mounting bracket. The handle includes a shaft, a pin at or near an end of the shaft, and a spring. The pin is configured to restrain movement of the spring in a first direction. The handle mount includes a body having a first end and a second end opposite the first end, a passageway through the body, and a first recess configured to receive the pin and lock the handle in the handle mount. The passageway has an inlet at the first end and an outlet at the second end and has a cross-sectional shape substantially the same as a cross-sectional shape of the shaft at the location of the pin, such that the shaft including the pin can be received in the passageway. The first recess opens at the outlet and extends longitudinally toward the inlet of the handle mount body.

The screed die box handle assembly of the preceding paragraph can optionally include, additionally and/or alternatively, any one or more of the following features, configurations and/or additional components:

A further embodiment of the foregoing screed die box handle assembly, wherein the spring is on an external surface of the shaft.

A further embodiment of the foregoing screed die box handle assembly, wherein the shaft of the handle further includes a shoulder positioned on an external surface of the shaft and configured to restrain movement of the spring in a second longitudinal direction opposite the first direction and wherein, a length extending from the shoulder to the end of the shaft is greater than a length of the passageway of the handle mount body.

A further embodiment of the foregoing screed die box handle assembly, wherein the spring is compressed against the first end of the handle mount body when the handle is locked in the handle mount.

A further embodiment of the foregoing screed die box handle assembly, wherein the pin extends through a cross-section of the shaft of the handle and wherein the pin has length that is greater than a width of the shaft and wherein the pin extends beyond the shaft on both a first and a second side of the shaft.

A further embodiment of the foregoing screed die box handle assembly, wherein the first recess opens to the first side of the handle mount body.

A further embodiment of the foregoing screed die box handle assembly, including a second recess configured to receive the pin, wherein the second recess is positioned opposite the first recess.

A further embodiment of the foregoing screed die box handle assembly, wherein the handle comprises a hollow tube.

A further embodiment of the foregoing screed die box handle assembly, wherein shaft of the handle includes a hollow tube, at least one of a first or second hole for holding the pin; and a plug seated in the end of the shaft and fixedly attached to the shaft. The plug has a third hole for holding the pin and wherein, which is aligned with at least one of the first or second hole.

A method for changing a handle on a screed die box includes the steps of: inserting a handle through a passageway of a mounting body on a screed die box holder; applying force to the handle such that a portion of the handle having a cross pin extends beyond an exit of the passageway; rotating the handle to align the cross pin with at least a first or second recess opening to an outlet of the passageway on the mounting body; and removing force applied to the handle to allow a tensioned spring to move the cross pin into at least one of the first or second recess on the holder and lock the position of the handle.

The method of the preceding paragraph can optionally include, additionally and/or alternatively, any one or more of the following features, configurations and/or additional components:

A further embodiment of the foregoing method including the steps of applying force to the handle when the cross pin is received in at least one of the first or second recesses 76, such that the portion of the handle having a cross pin extends beyond the outlet of the passageway; rotating the handle to align the cross pin with the passageway; and removing force applied to the handle to allow the tensioned spring to move the handle back toward the inlet of the passageway such that the cross pin is received in the passageway.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like. One skilled in the art can appreciate that although directional terms such as "forward," "rearward," "bottom," and "top," have been used in describing this invention, such terms are merely relational descriptors of the illustrated embodiments shown herein.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A quick disconnect handle assembly comprising:
    a handle comprising:
        a shaft;
        a spring; and
        a pin positioned at or near an end of the shaft and between the spring and the end of the shaft, the pin being configured to restrain movement of the spring in a first direction; and
    a handle mount separable from the handle, the handle mount having a hollow body comprising:
        an internal passageway extending axially between an inlet at a first end of the hollow body and an outlet at a second end of the hollow body opposite the first end, wherein the internal passageway has a cross-sectional shape substantially the same as a cross-sectional shape of the handle at the location of the pin with the cross-sectional shape extending from the inlet to the outlet, such that the shaft including the entirety of the pin can be received within the internal passageway from the inlet to the outlet; and
        a first recess configured to receive the pin and lock the handle in the handle mount, wherein the first recess opens to the outlet and extends longitudinally toward the inlet of the hollow body.

2. The quick disconnect handle assembly of claim 1, wherein the spring is on an external surface of the shaft.

3. The quick disconnect handle assembly of claim 2, wherein the shaft of the handle further comprises:
a shoulder positioned on an external surface of the shaft and configured to restrain movement of the spring in a second longitudinal direction opposite the first direction and wherein, a length extending from the shoulder to the end of the shaft is greater than a length of the internal passageway of the hollow body.

4. The quick disconnect handle assembly of claim 3, wherein the spring is a helical spring.

5. The quick disconnect handle assembly of claim 1, wherein the spring is compressed against the first end of the hollow body when the handle is locked in the handle mount.

6. The quick disconnect handle assembly of claim 1, wherein the pin extends through a cross-section of the shaft of the handle and wherein the pin has length that is greater than a width of the shaft and wherein the pin extends beyond the shaft on both a first and a second side of the shaft.

7. The quick disconnect handle assembly of claim 1, wherein the first recess extends through a wall of the hollow body.

8. The quick disconnect handle assembly of claim 7, wherein the handle mount further comprises:
a second recess configured to receive the pin, wherein the second recess is positioned opposite the first recess on the shaft.

9. The quick disconnect handle assembly of claim 1, wherein the shaft of the handle further comprises:
a hollow tube
at least one of a first hole or a second hole for holding the pin; and
a plug seated in the end of the shaft and fixedly attached to the shaft, wherein the plug has a third hole for holding the pin and wherein, the third hole is aligned with at least one of the first hole or the second hole.

10. A screed die box having the quick disconnect handle assembly of claim 1.

11. A quick disconnect handle assembly comprising:
a handle comprising:
a shaft;
a spring; and
a pin positioned between the spring and an end of the shaft, the pin being configured to restrain movement of the spring in a first direction; and
a handle mount, wherein the handle mount is separable from the handle and has a hollow body comprising:
an internal passageway extending axially between an inlet at a first end of the hollow body and an outlet at a second end of the hollow body opposite the first end and with openings only at the inlet and the outlet, wherein the internal passageway has a geometry that allows passage of the shaft and the pin from the inlet to the outlet; and
a first recess configured to receive the pin and lock the handle in the handle mount, wherein the first recess opens to the outlet and extends longitudinally toward the inlet of the hollow body.

12. The quick disconnect handle assembly of claim 11, wherein the spring is on an external surface of the shaft.

13. The quick disconnect handle assembly of claim 12, wherein the shaft of the handle further comprises:
a shoulder positioned on an external surface of the shaft and configured to restrain movement of the spring in a second longitudinal direction opposite the first direction and wherein, a length extending from the shoulder to the end of the shaft is greater than a length of the internal passageway of the hollow body.

14. The quick disconnect handle assembly of claim 11, wherein the spring is compressed against the first end of the hollow body when the handle is locked in the handle mount.

15. The quick disconnect handle assembly of claim 11, wherein the pin extends through a cross-section of the shaft of the handle and wherein the pin has length that is greater than a width of the shaft and wherein the pin extends beyond the shaft on both a first and a second side of the shaft.

16. The quick disconnect handle assembly of claim 11, wherein the first recess extends through a wall of the hollow body.

17. The quick disconnect handle assembly of claim 16, wherein the handle mount further comprises:
a second recess configured to receive the pin, wherein the second recess is positioned opposite the first recess on the shaft.

18. The quick disconnect handle assembly of claim 11, wherein the handle mount is connected to a screed die box and wherein internal passageway has a cross-sectional shape substantially the same as a cross-sectional shape of the handle at the location of the pin with the cross-sectional shape extending from the inlet to the outlet.

* * * * *